US006814240B2

(12) United States Patent
Loth

(10) Patent No.: US 6,814,240 B2
(45) Date of Patent: Nov. 9, 2004

(54) INSTALLATION FOR CLEANING WOOD-CONTAINING MATERIAL

(75) Inventor: Robert Loth, Lage-Müssen (DE)

(73) Assignee: B. Maier Zerkleinerungstechnik GmbH, Bielefeld (DE)

( * ) Notice: Subject to any disclaimer, the term of this patent is extended or adjusted under 35 U.S.C. 154(b) by 66 days.

(21) Appl. No.: 10/251,533

(22) Filed: Sep. 19, 2002

(65) Prior Publication Data

US 2003/0056306 A1 Mar. 27, 2003

(30) Foreign Application Priority Data

Sep. 21, 2001 (DE) ........................................ 101 46 512

(51) Int. Cl.[7] ................................................ B03C 1/00
(52) U.S. Cl. ......................................... 209/40; 209/219
(58) Field of Search .............................. 209/22–40, 219

(56) References Cited

U.S. PATENT DOCUMENTS

| | | | | |
|---|---|---|---|---|
| 2,210,103 A | * | 8/1940 | Stoner | 209/31 |
| 3,769,660 A | * | 11/1973 | Schuette, Jr. | 19/202 |
| 4,242,197 A | * | 12/1980 | Voelskow et al. | 209/3 |
| 4,382,857 A | * | 5/1983 | Laughlin | 209/23 |
| 4,447,319 A | * | 5/1984 | Lazik | 209/11 |

FOREIGN PATENT DOCUMENTS

| | | | | |
|---|---|---|---|---|
| DE | 19539499 | | 5/1997 | |
| DE | 19821437 | | 11/1999 | |
| JP | 05169045 A | * | 7/1993 | B09B/5/00 |
| JP | 10211444 | | 8/1998 | |

OTHER PUBLICATIONS

Search Report from European Patent Office for corresponding application No. EP02018883 dated Aug. 25, 2003.

* cited by examiner

*Primary Examiner*—Donald P. Walsh
*Assistant Examiner*—Joseph Rodriguez
(74) *Attorney, Agent, or Firm*—Klarquist Sparkman, LLP

(57) ABSTRACT

The invention relates to an installation for cleaning wood-containing material, comprising the following features:

with a feeding zone;
with a pre-sifter station
with a magnetic separator comprising a magnetic roller;
with a wind sifter as a separator of heavy materials which is situated underneath the magnetic roller;
with an air system for sifting the flow of material with the following arrangement:
- an upper deflection conduit section for deflecting the material flow from the horizontal downwardly is guided about the magnetic roller;
- a drop section is connected to the upper deflection conduit section;
- a lower deflection conduit is connected to the lower end of the drop section;
- the lower zone of the drop section comprises a separator for heavy materials;
- an air conduit for holding back material opens into the lower part of the drop section;
- a movable baffle wall with swiveling flaps or air nozzles for ejecting NF materials is provided in the drop section.

4 Claims, 1 Drawing Sheet

INSTALLATION FOR CLEANING WOOD-CONTAINING MATERIAL

FIELD

The invention relates to the field of comminution technology, especially the field of comminution of waste wood. It concerns residual wood from sawmills, residual industrial wood, recycling wood or other waste wood.

The present application claims the benefit under 35 U.S.C. § 119 of the earlier filing date of German patent application No. DE 101 46 512.2-23, which is incorporated herein by reference.

The invention relates according to claim 1 to an installation for cleaning wood-containing material.

BACKGROUND

DE 198 21 437 A1 describes an installation for cleaning wood chips. The installation comprises a plurality of units such as a vibrating screen, an iron separator, a heavy material separator, a non-iron sifter and separator.

Such installations are exceptionally large and comprise a plurality of treatment and processing stations which are connected with each other through conveying systems and intermediate bunkers. The system concerns the comminution of the obtained material, as well as the cleaning thereof. It is necessary to extract foreign matter from the comminuted waste wood. These include non-metallic heavy materials such as stones, metals, namely iron as well as non-ferrous metals (NF metals).

SUMMARY

The invention is based on the object of arranging such an installation in such a way that it fulfills its function in an efficient manner, that it is simple and cost-effective in its structure, and that it is as compact as possible and thus requires little space. This object is achieved by the features of claim 1. The main idea is that the separation of heavy materials is provided downstream of the separation of NF metals. This is based on the following consideration: NF metals are generally lighter than the heavy impurities such as stones or the like. That is why the separation for the NF metals occur with relatively "soft" means, generally by means of an air flow which is applied transversally to the main flow or by means of a swivelable flap in order to deflect the NF metals from the main flow. This means that the main flow, which comprises heavy impurities and air, is impaired to a very low extent. This is important for the separation of the heavy impurities, where controlled conditions of the flow are especially important.

DETAILED DESCRIPTION

Figure 1:
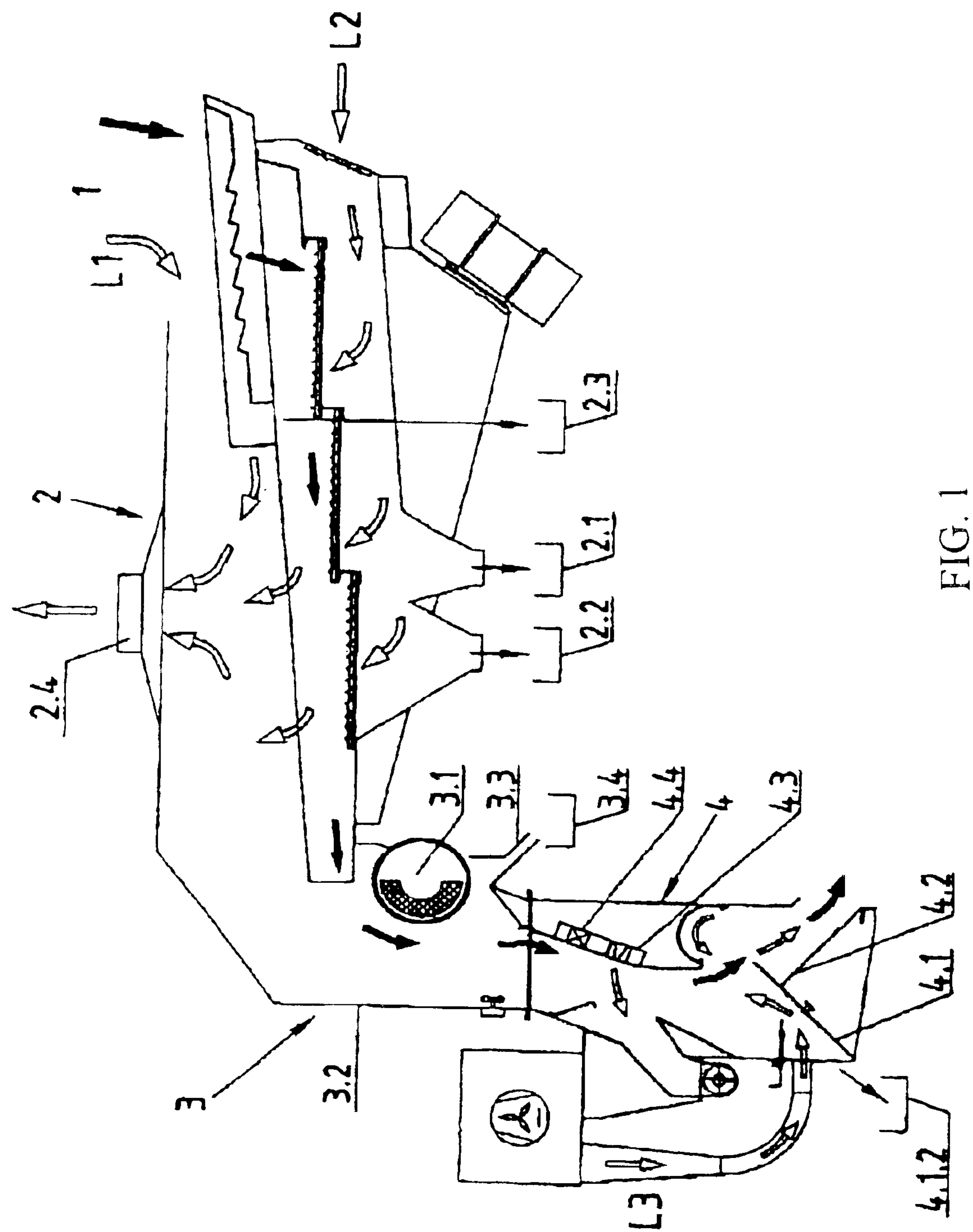
FIG. 1 is a schematic drawing of an installation for cleaning wood-containing material.

Embodiments of the invention are explained in greater detail by reference to FIG. 1.

The installation shown therein is arranged as follows:

The installation comprises a feeding zone 1. The wood-containing material to be treated is supplied here. In the case of the illustrated embodiment the material consists of comminuted pallets. The fragments contain impurities such as nail, sand and stones.

A pre-sifter station 2 is connected downstream of the feeding zone 1. Excessively large particles and sand are separated here (cf. sand funnels 2.1, 2.2 and the collecting container 2.3 for the excessively large particles).

The flow of material is supplied to the feeding zone 1 in combination with the air flow L1. A further air flow L2 is supplied to the pre-sifter station 2 under simultaneous screening of fine material. The conveyance of the material is supported by the combined air flows L1 and L2, which is in the illustration from the right to the left. Dust and films are also carried off, namely through a dust outlet 2.4 located in the upper part of the pre-sifter station 2.

The conveyance of the entire flow which is formed by the material on the one hand and the air on the other hand occurs in a substantially closed conduit system (cf. the housing 2.5 of the pre-sifter station 2 as well as the downstream housing or conduit zones).

A magnetic separator 3 is situated downstream of the pre-sifter station. It comprises a magnetic roller 3.1. A deflection of the entire flow by approx. 90 degrees occurs here, namely from the horizontal into a vertical movement. The associated conduit section 3.2 of the magnetic separator 3 is arranged accordingly. Iron parts are supplied through a side conduit 3.3 to a collecting container 3.4.

An at least approximately vertical conduit section 4 follows next. It can be designated as a drop section. The flow which is made of material and air and is relieved of iron parts travels downwardly there. In the lower region of the vertical conduit section 4 there is a baffle wall 4.1 and a baffle wall 4.2. The baffle wall 4.1 is used for discharging heavy materials. They are collected in the heavy-material container 4.1.2. A further air flow L3 is introduced against the falling direction into the vertical conduit section 4. It is used to deflect the flow of wood ships from the vertical to the horizontal direction and to prevent that the wood chips migrate outwardly along the baffle wall 4.1.

A movable baffle wall 4.3 can be recognized in the vertical conduit section 4. It is attached flexibly at the upper end of the vertical conduit section and can be swiveled in the conduit. A sensor 4.4 is arranged upstream. It can be attached in the baffle wall or in the opposite cover wall. The sensor can be made from one part, or can consist of several individual elements. It detects NF metals when they occur and controls a swivelable flap or individual flap segments via a processor (not shown here), which flaps eject the NF metals at a given time. Alternatively, the NF parts can also be blown out by means of an air flow from air nozzles.

The flow of wood chips that has been relieved of all impurities travels through the lower deflection conduit where it is supplied for further processing.

The entire installation operates with high sifting precision. This means that the individual materials to be sorted out such as heavy materials, dust, NF metals, etc. are removed from the batch material with a high separation precision.

The installation is characterized by a simple arrangement. It is very compact and requires little space.

An important advantage is that even existing plants can be retrofitted according to the invention.

What is claimed:

1. An installation for cleaning wood-containing material, comprising:

a feeding zone;

a magnetic separator comprising a magnetic roller;

a wind sifter as a separator of heavy materials which is situated underneath the magnetic roller; and an air system for sifting a flow of material, the air system comprising an upper deflection conduit section guided about the magnetic roller for deflecting the material flow from a horizontal flow downwardly is guided about the magnetic roller, a drop section connected to the upper deflection conduit section, a lower deflection conduit connected to a lower end of the drop section, the lower end of the drop section comprising a heavy-material separator, an air conduit for holding back material, the air conduit opening into the lower part of the drop section; and a movable baffle wall with swiveling flaps or air nozzles for ejecting non-ferrous materials, the baffle wall being provided in the drop section.

2. The installation according to claim 1, whereby individual treatment stations, or the largest part thereof, are arranged in a single housing to form a compact unit.

3. The installation according to claim 1 further comprising a pre-sifter station downstream of the feeding zone.

4. The installation according to claim 2, whereby a pre-sifter station is provided downstream of the feeding zone.

* * * * *